United States Patent [19]

Noda et al.

[11] Patent Number: 5,451,122
[45] Date of Patent: Sep. 19, 1995

[54] CHIP COLLECTOR AND FACE MILLING CUTTER

[75] Inventors: Mitsuaki Noda; Akio Nakamura; Katsutoshi Yamane, all of Itami, Japan

[73] Assignee: Sumitomo Electric Industries Co., Ltd., Osaka, Japan

[21] Appl. No.: 324,755

[22] Filed: Oct. 4, 1994

[30] Foreign Application Priority Data

Oct. 5, 1993 [JP] Japan ............................. 5-054025 U
Oct. 28, 1993 [JP] Japan ............................. 5-058437 U

[51] Int. Cl.⁶ .................. B23C 7/00; B23B 47/34; B23Q 11/06
[52] U.S. Cl. ................. 409/137; 407/115; 408/61; 451/456
[58] Field of Search ............... 409/134, 137; 408/61, 408/56, 241 R, 241 G; 407/33, 51, 115, 34; 144/251 R, 252 R; 29/DIG. 59, DIG. 86; 451/456, 455, 451

[56] References Cited

U.S. PATENT DOCUMENTS

| | | | |
|---|---|---|---|
| 1,990,991 | 2/1935 | Heubach | 409/137 |
| 2,944,465 | 7/1960 | Jones | 409/137 |
| 3,167,465 | 1/1965 | Gibbons et al. | 409/137 X |
| 5,026,221 | 6/1991 | Arai et al. | 409/137 |

FOREIGN PATENT DOCUMENTS

| | | | |
|---|---|---|---|
| 275835 | 2/1990 | Germany | 409/134 |
| 5277886 | 10/1993 | Japan | 409/137 |
| 6055402 | 3/1994 | Japan | 409/134 |
| 6170683 | 6/1994 | Japan | 409/137 |
| 1454649 | 1/1985 | U.S.S.R. | 409/137 |
| 1143576 | 3/1985 | U.S.S.R. | 409/137 |

*Primary Examiner*—William Briggs
*Attorney, Agent, or Firm*—Wenderoth, Lind & Ponack

[57] ABSTRACT

A chip collector is proposed which can collect chips efficiently and which is easy to maintain and allows replacement of throwaway inserts without removing the cutting tool from a spindle of a machine tool. The cylindrical casing is divided into two casing halves, one of which is pivotable from the other around a hinge. The chip collector is provided with a sub-chamber connected to a chip suction port and a discharge duct connected to the sub-chamber. Also, a face milling cutter used in combination with the chip collector is proposed.

10 Claims, 9 Drawing Sheets

CHIP COLLECTOR AND FACE MILLING CUTTER

BACKGROUND OF THE INVENTION

The present invention relates to a chip collector for collecting chips produced during cutting operation, and a face milling cutter used with such a chip collector.

Chip collectors of this type are disclosed e.g. in Unexamined Japanese Utility Model Publications 2-104915, 2-107452 and 2-145944.

These chip collectors have a cylindrical casing surrounding a face milling cutter and having a suction port formed in the casing. Chips produced in the casing by the cutter are sucked out through the suction port.

In some conventional arrangements, air is blown out of the face milling cutter to improve the flow of chips (Unexamined Japanese Utility Model Publications 4-115517 and 4-115518).

Any of these conventional chip collectors has a one-piece casing. Thus, it was impossible to clean or inspect the interior of the casing or replace throwaway inserts mounted on the cutter without removing the face milling cutter from the spindle of a machine tool. Also, the casing tends to be a major obstacle when attaching and detaching the face milling cutter. Thus, conventional chip collectors have many maintenance-related problems.

Moreover, since round suction ports are formed at a right angle to the casing, it is difficult to discharge chips smoothly. In order to improve the chip-discharging capacity, other conventional devices are provided with a chip-collecting space and a guide member for guiding chips into the chip-collecting space. In this arrangement, after introducing chips into the collecting space, they are collected by sucking them. Another conventional device is further provided with a means for blowing air to discharge chips. In spite of these prior efforts, it was still difficult to discharge chips sufficiently smoothly.

Thus, in order to collect chips with high efficiency, a powerful dust collector was needed.

Now therefore, an object of the present invention is to provide a chip collecting device which is easy to maintain and which allows replacement of throwaway inserts without detaching it from the machine tool and which can discharge chips smoothly without requiring a large suction force.

A second object of the present invention is to provide a face milling cutter which is to be used with the chip collector of the present invention to collect chips with high efficiency.

SUMMARY OF THE INVENTION

In order to attain these objects, the chip collector of the present invention comprises a cylindrical casing surrounding the face milling cutter, a fixed flange which is provided outside a spindle of a machine tool and which serves as a top lid of the casing, the casing having at upper portion thereof an inner flange having an inner peripheral surface detachably mounted on the fixed flange, and at lower portion thereof a lower ring arranged concentrically with the face milling cutter and located near the cutting edge of the face milling cutter, the entire casing including the inner flange and the lower ring being circumferentially divided into two casing halves substantially at center thereof, the casing being opened and closed by pivoting one of the casing halves about a hinged portion, one of the casing halves being provided with a chip suction hole having a rectangular section and opening for a substantial circumferential length, a spiral sub-chamber expanding gradually outwards from the chip suction hole in the direction of rotation of the face milling cutter, and a discharge duct extending from the end of the sub-chamber in a tangential direction, the lower ring having an inner surface inclined upwards, the lower ring having in the inclined inner surface a plurality of air blowout holes arranged circumferentially at a predetermined pitch and directed substantially in the rotating direction of the face milling cutter to blow out air obliquely upwards.

In an arrangement wherein the casing comprises a fixed sleeve carrying the inner flange and a movable sleeve carrying the lower ring and slidably coupled with the fixed sleeve, and wherein the fixed sleeve is provided with a positioning means for keeping the movable sleeve in position at a desired point, it is possible to use this device for face milling cutters having a wide range of thicknesses (heights).

In order to achieve the second object, according to the present invention, there is provided a face milling cutter comprising a cutter body having chip pockets and grooves formed in outer periphery thereof, cutting inserts clamped in the grooves, the each cutting insert being formed with a main cutting edge and a flat drag, the chip pockets being formed along the main cutting edges, and barrier walls formed integrally with the cutter body for closing the front side of the chip pockets, a gap being defined between the barrier wall and a rake face of the flat drag so that chips are introduced into the chip pocket through the gap.

Where necessary, a face milling cutter may be provided with a cover plate for closing the opening of the chip pocket along the outer periphery of the body, the cover plate being in contact with the barrier wall while leaving a chip-introducing gap between the cover plate and a rake face of the main cutting edge.

This face milling cutter is preferably formed with a guide recess in the rear of each chip pocket for changing the feed direction of chips toward the outer periphery of the cutter.

According to the present invention, since the casing is divided in half so that the casing can be opened, it is possible to clean the interior of the casing by opening the divided casing without detaching the face milling cutter from the machine tool. By opening the divided casing, at least half the internal tools (or whole of them if the casing is opened and detached) are exposed to the outside, it is possible to replace throwaway inserts without detaching the face milling cutter from the spindle. Thus, tools can be attached to and detached from the spindle of a machine tool without limitation.

The suction holes have a rectangular shape and are provided over a wide range. The sub-chamber connected to the suction hole widens gradually while arcuately curving moderately. The discharge duct extends tangentially from the terminal end of the sub-chamber. With this arrangement, chips smoothly flow through the suction hole into the sub-chamber due to their own flow energy. Then, they are guided along the moderately curved inner wall of the sub-chamber without encountering any significant resistance and discharged.

In a conventional arrangement in which long chips are forcibly turned toward the chip-collecting space by the guide member, the flow energy of chips tends to drop sharply. The device of the present invention is free of this problem because chips encounter minimum resistance while being discharged. Chips are thus discharged with utmost efficiently.

In a conventional arrangement, air flow is directed at the cutting portion. Chips are carried by the air flow reflected from the cutting portion. Thus, they cannot be carried out of the cutting region with high efficiency. According to the present invention, air is blown out obliquely upwards through the air blowout ports formed in the inclined inner peripheral surface of the lower ring substantially in the direction of rotation of the tool. Thus, chips are blown up directly by the blown out air and carried smoothly by the air flow toward the discharge end. Chips are thus discharged smoothly with a minimum amount of suction force.

By supplying cooled air (though normal-temperature air is acceptable), it is possible to reduce the heat produced e.g. in machining cast iron and thus to minimize any thermal influence on the discharge port and the dust collector. Also, instead of supplying air, a coolant may be supplied not only for cooling but for guiding the chip effectively toward the discharge port.

The chip collector according to the present invention has a divided casing which can be opened. Thus, it is possible to clean and inspect the interior of the casing and to replace throwaway inserts with the face milling cutter mounted to the spindle.

Also, by opening one of the divided halves of the casing or detaching the entire casing from the fixed flange, the tool can be easily and quickly attached to and detached from the spindle of the machine tool.

Moreover, since chips can be smoothly introduced into the sub-chamber and sucked therefrom, they can be collected efficiently without the need for a powerful dust collector.

Other features and objects of the present invention will become apparent from the following description made with reference to the accompanying drawings, in which:

DETAILED DESCRIPTION OF THE PREFERRED EMBODIMENT

FIGS. 1-7 show a preferred embodiment of the chip collector of the present invention.

Figure 1:
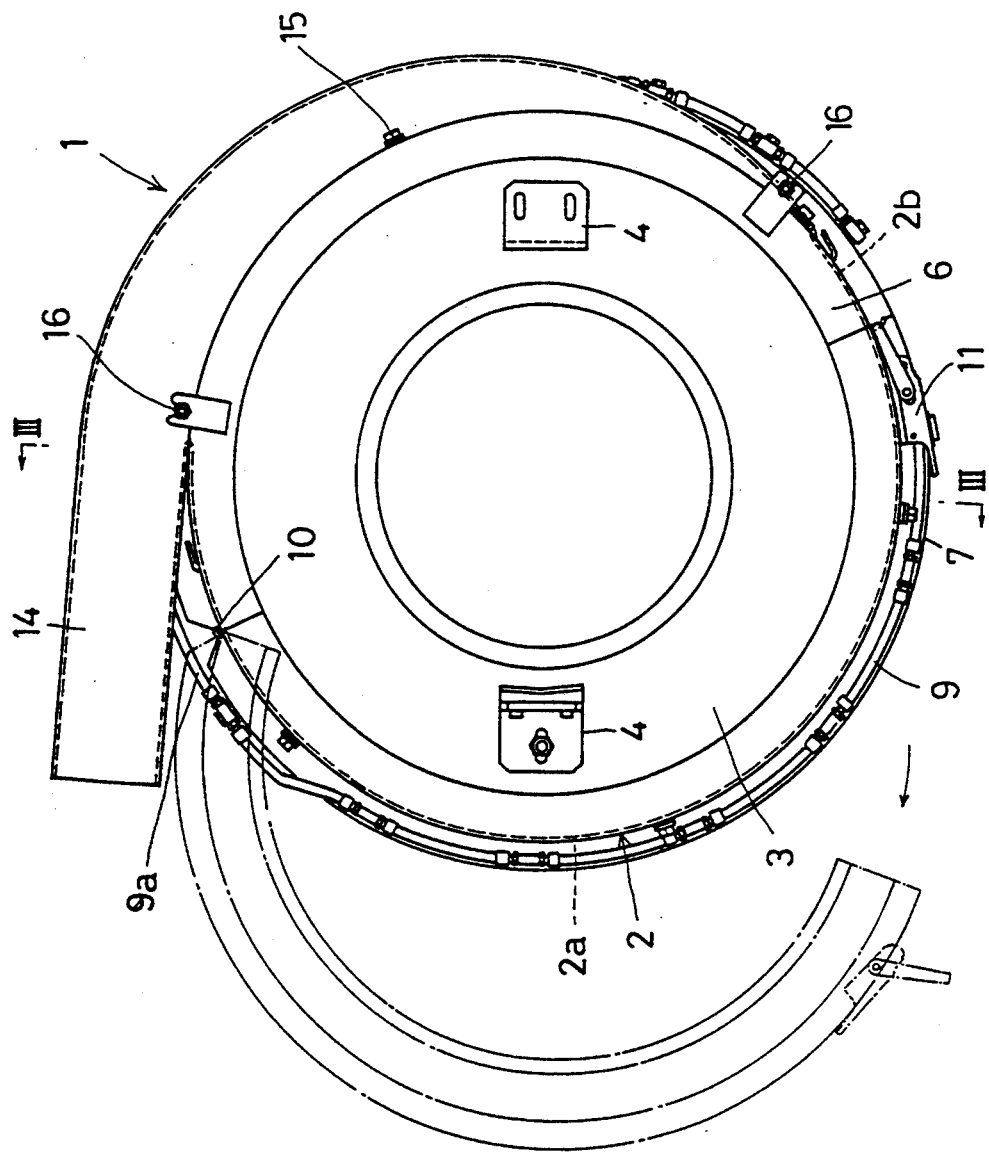
FIG. 1 is a plan view showing one embodiment of the chip collector according to the present invention.
Figure 2:
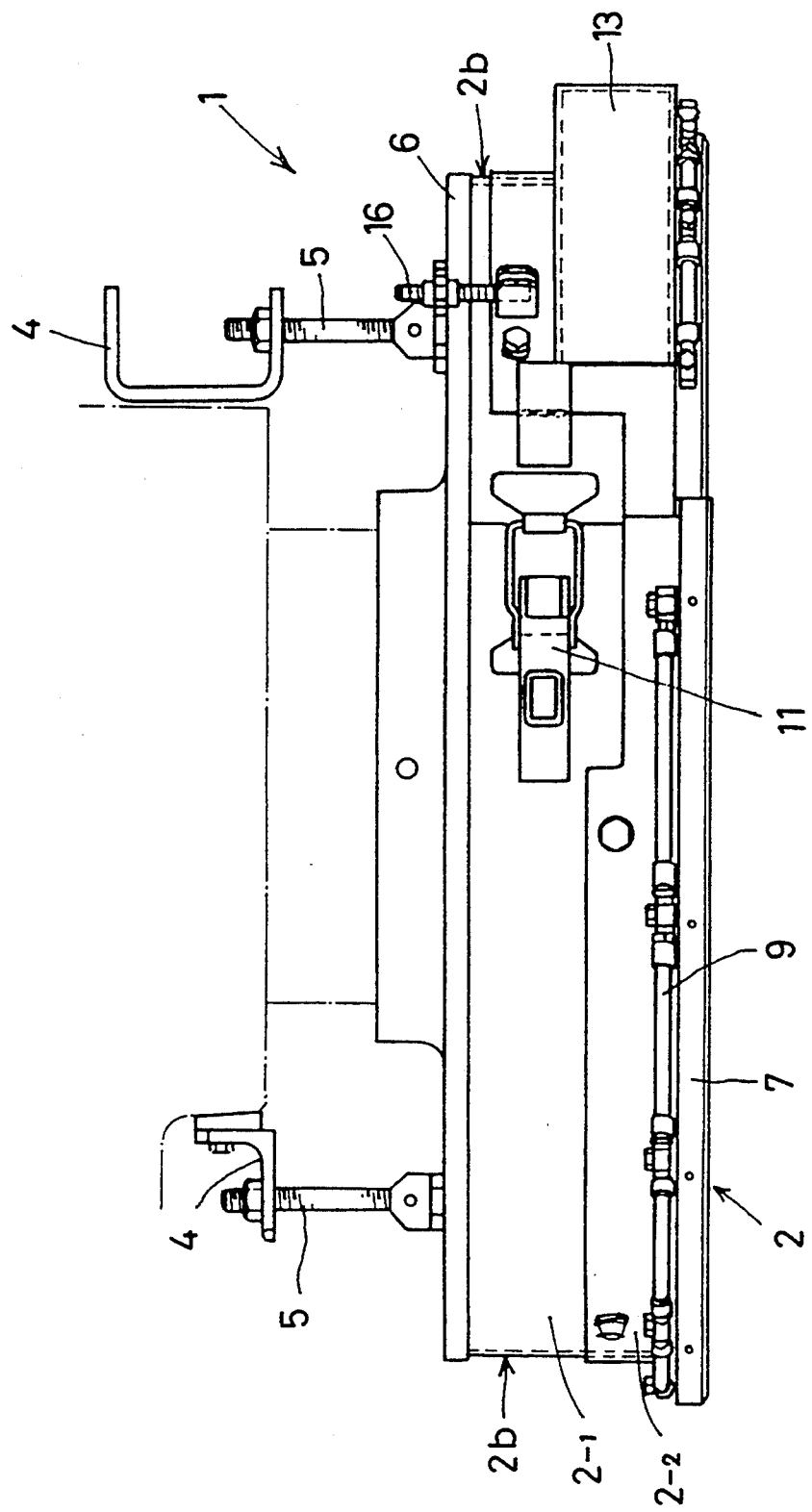
FIG. 2 is a side view of the same.
Figure 3:
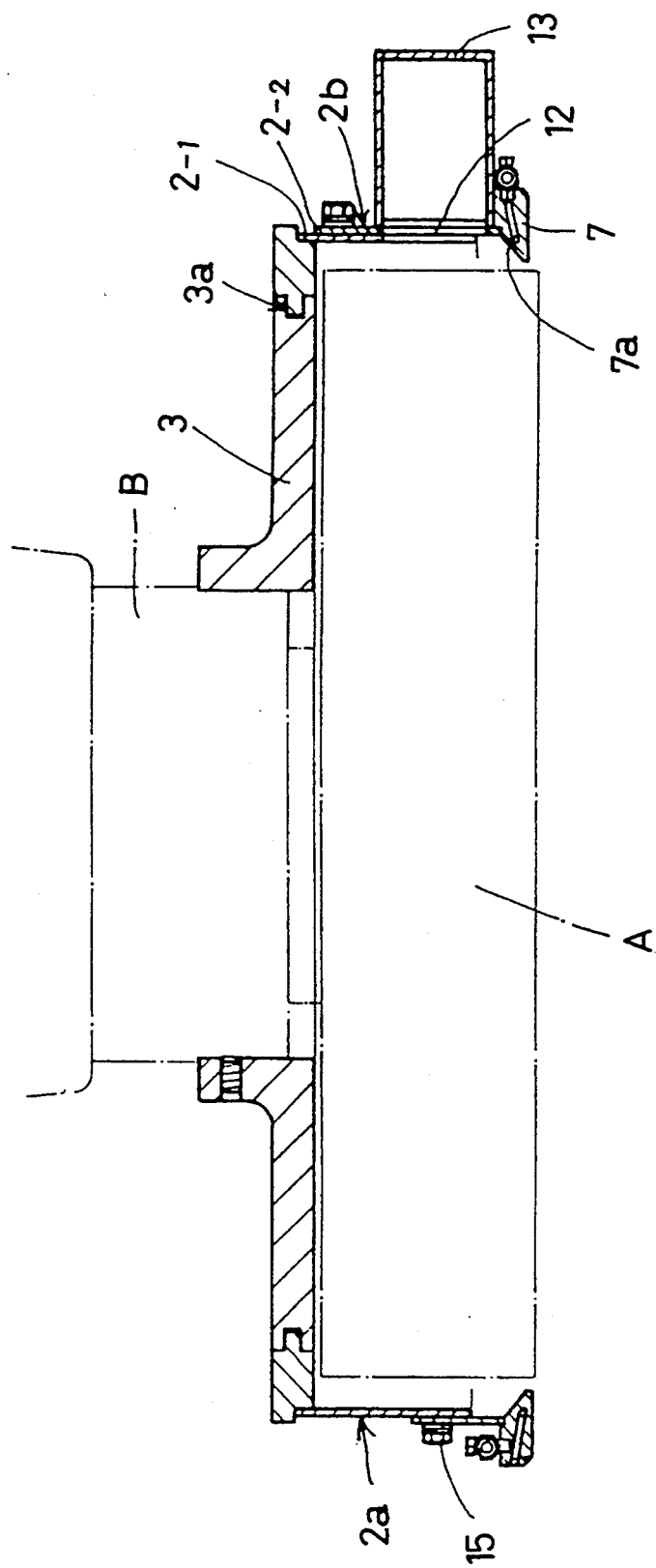
FIG. 3 is a sectional view taken along line III—III of FIG. 1.

As shown in FIGS. 1 to 3, the chip collector 1 of this embodiment comprises a cylindrical casing 2 surrounding the outer circumferential surface of a face milling cutter A, and a fixed flange 3 which serves as the top lid of the casing. The fixed flange 3 is concentrically fitted on a fixed sleeve B of the spindle of a machine tool and suspended from brackets 4 secured to a stationary portion of the machine tool through a plurality of suspension bolts 5.

The casing has an upper inner flange 6 and a lower ring 7. The inner flange 6 is mounted to the outer periphery of the fixed flange 3 through a rib-and-groove connection 3a. The connection 3a in this embodiment comprises a groove formed in the outer periphery of the fixed flange 3 and a rib formed on the inner periphery of the inner flange 6 and detachably fitted in the groove. The relation between the rib and the groove may be reversed.

Figure 5:
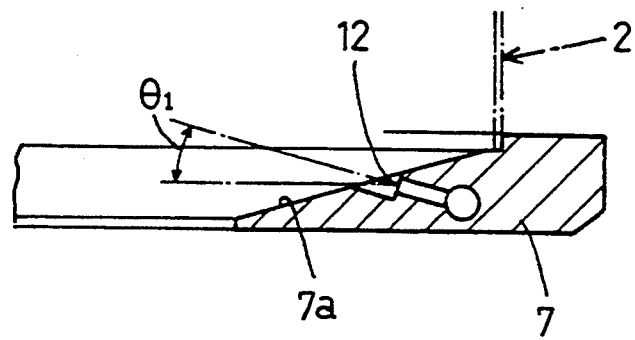
FIG. 5 is a sectional view showing the air blowout port of the lower ring.
Figure 6:
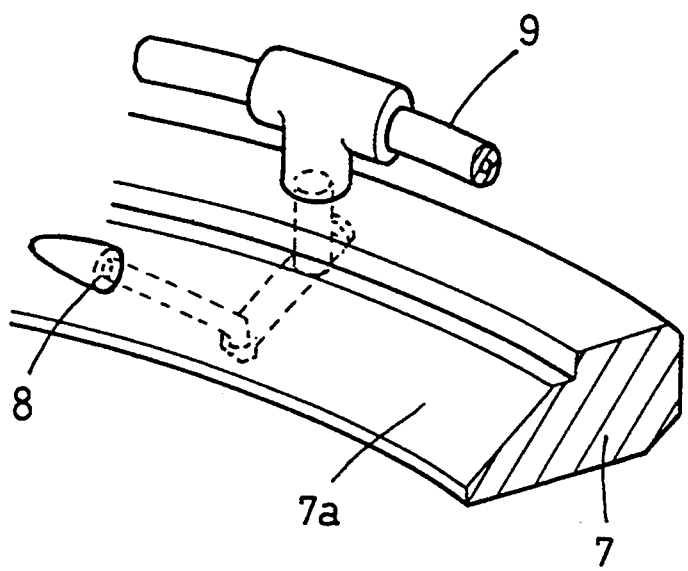
FIG. 6 is a perspective view of a portion of the lower flange.

The lower ring 7 has its inner edge disposed as close to the cutting edge of the face milling cutter A as possible to prevent chips from dropping by gravity. As shown in FIGS. 3, 5 and 6, it has an inner surface 7a tapered radially outwards, so that chips are smoothly guided outwards along the tapered inner surface 7a. Air blowout ports 8 are formed in substantially the central part of the inner surface 7a (FIG. 6). Even if the air blowout ports 8 are provided parallel to the plane of the cutting surface, it is possible to blow up chips because air is supplied from below. But preferably, the ports 8 should be inclined by an angle $\theta$ as shown in FIG. 5. This angle should not exceed 30°. If more than 30°, it would become difficult to supply a sufficient amount of air to the cutting portion.

Figure 4:
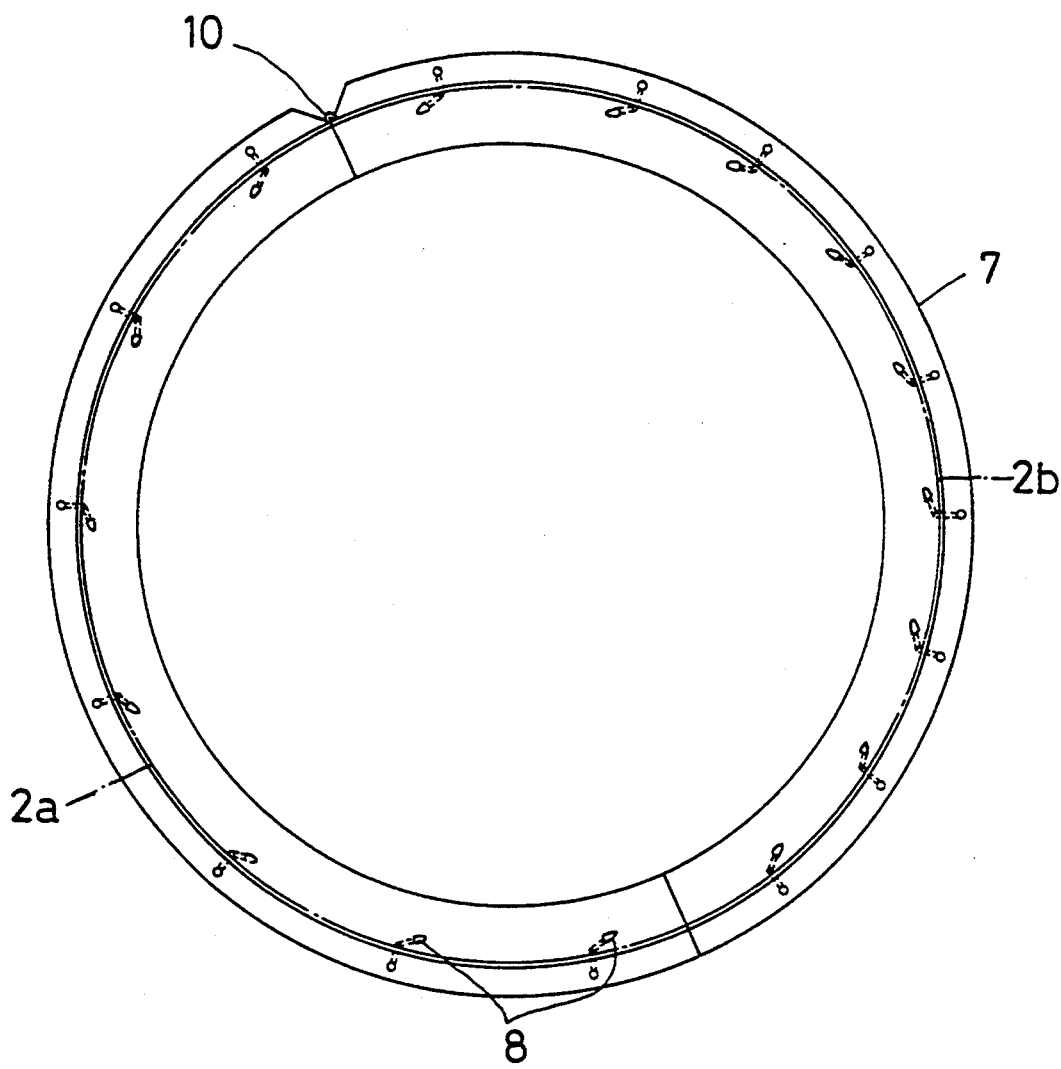
FIG. 4 is a plan view of the lower ring.

As shown in FIG. 4, the air blowout ports 8 are arranged circumferentially at a predetermined pitch. Each port extends substantially in the direction of rotation of the face milling cutter while slightly inclined radially inwards. Air is supplied partly to the top surface of the inner ring 7 and partly into a tube 9 that runs along the outer periphery of the ring 7 (FIG. 6). The tube 9 has to be flexible at least at its portion 9a (FIG. 1) so that the casing can be opened. The remaining portion of the tube 9 may be made of a rigid material or a flexible material.

The casing 2 is circumferentially divided into two halves 2a and 2b substantially along its diameter, together with the inner flange 6 and the lower ring 7. The divided halves 2a and 2b are connected together at one end thereof by means of a hinge 10 (FIG. 1) so that at least one of the halves 2a, 2b is pivotable about the hinge between the closed position and the open position as shown by chain line in FIG. 1. An adjustable fastener 11 is provided at the other end of one of the halves. When in the closed position, the casing halves 2a, 2b are coupled together at the other ends by the fastener 11.

Figure 7:
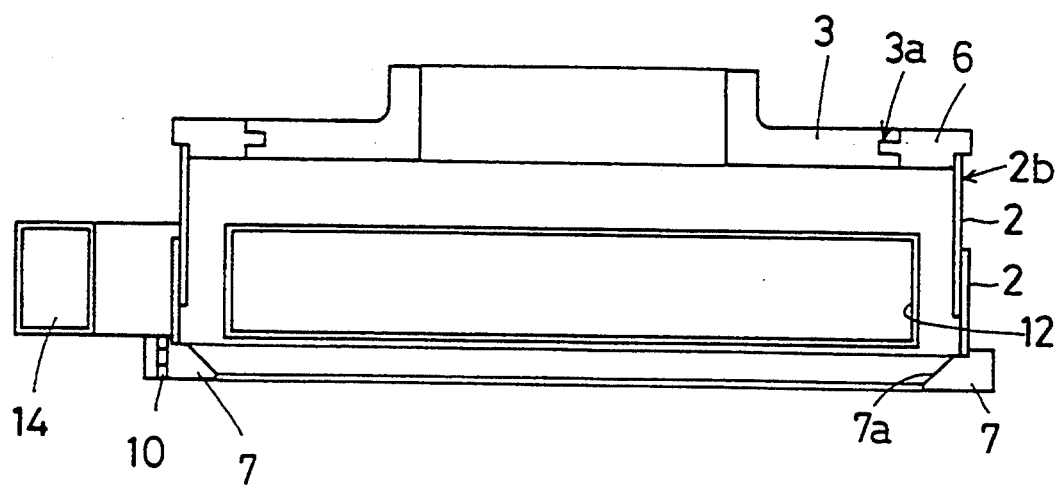
FIG. 7 is a view of the divided hood having a suction hole as seen from the divided side.
Figure 8:
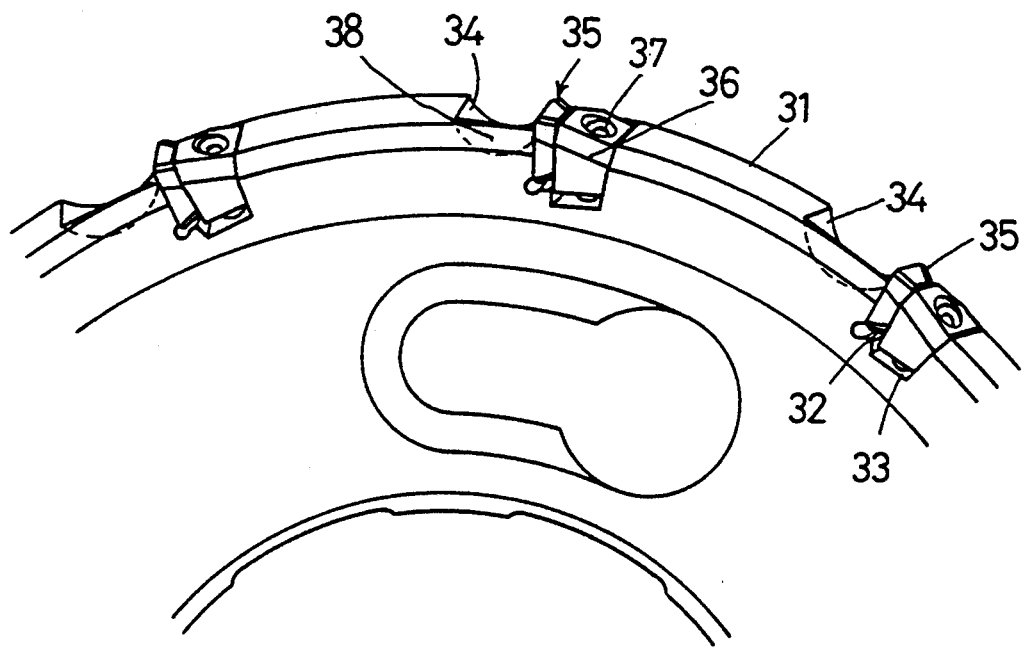
FIG. 8 is a partial plan view of one embodiment of the cutter according to the present invention.
Figure 9:
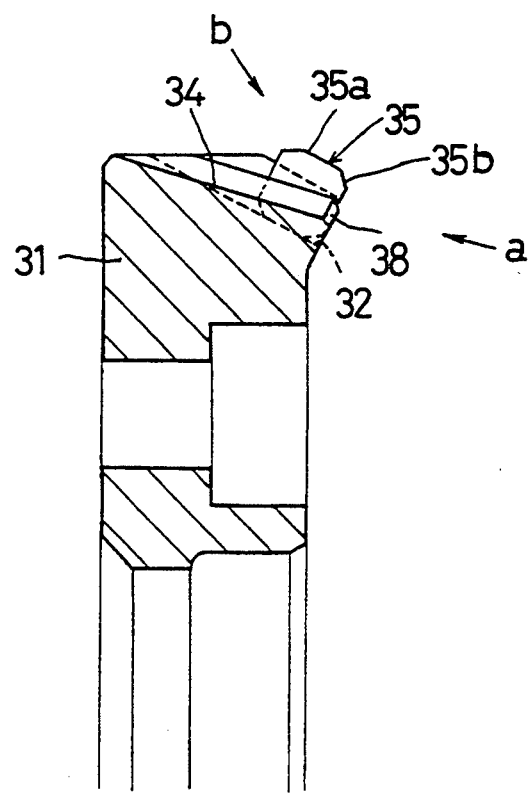
FIG. 9 is a partial sectional view of the same.
Figure 10:
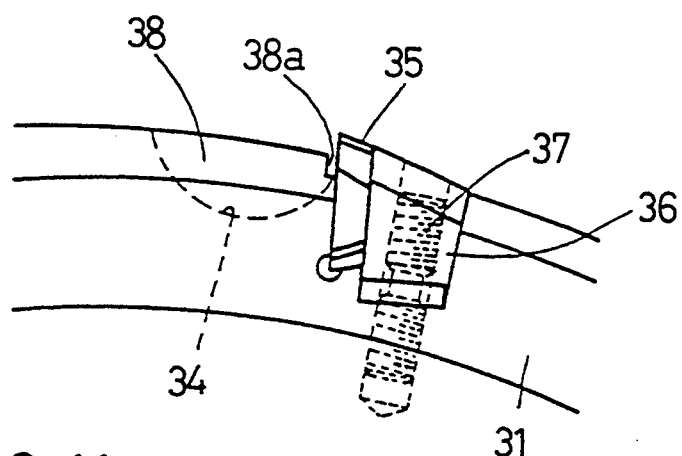
FIG. 10 is a view as seen in the direction of arrow a of FIG. 9.
Figure 11:
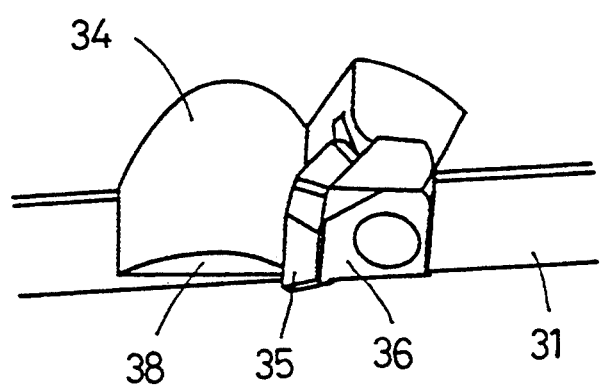
FIG. 11 is a view as seen in the direction of arrow b of FIG. 9.

As shown in FIG. 7, the casing half 2b is formed with a rectangular suction hole 12 that extends for a substantial length of the entire circumference thereof. The suction hole 12 communicates with a discharge duct 14 through a sub-chamber 13. The width of the sub-chamber 13 increases gradually in the direction of rotation of the face milling cutter A, so that the feed direction of chips introduced into the sub-chamber can be changed smoothly with little resistance by guiding them along the moderately curved peripheral wall of the sub-chamber.

The discharge duct 14 extends tangentially from the distal end of the sub-chamber 13. The chip collector 1 is mounted on the machine tool so that the discharge duct 14 extends substantially in parallel with the feed direction of the face milling cutter, with the duct outlet facing opposite the feed direction of the cutting tool. With this arrangement, the suction hole 12 is located near the cutting portion, so that chips will smoothly flow into the sub-chamber 13 and can be collected efficiently. If this discharge duct 14 is connected to a dust collector (not shown) through a flexible duct, it becomes possible to pivot the casing half 2b about the hinged portion and thus to remove the entire casing 2 from the fixed flange 3.

In this embodiment, as shown in FIG. 3, the casing 2 comprises an inner sleeve 2-1 and an outer slidable sleeve 2-2. The height of the casing is thus changeable. The inner flange 6 is mounted to the top of the inner sleeve 2-1 and the lower ring 7 to the bottom of the outer sleeve 2-2. Further, the inner sleeve 2-1 and outer sleeve 2-2 are fixed together by means of bolts 15 (see FIGS. 1 and 2) that extend through elongated holes (not shown). The height of the casing 2 can be changed by loosening the bolts 15 and adjusting the height of the outer sleeve 2-2 with positioning means 16 (which are adjusting bolts fastened to the inner flange 6). Thus, the height of the casing can be changed according to the height of the face milling cutter A used so that chips can be collected most efficiently.

FIGS. 8-13 show the embodiment of the face milling cutter of the present invention.

Numeral 31 in the figures indicate a cutter body. Arranged along the top edge of the body 31 at predetermined pitches are seating grooves 32 which receive throwaway inserts 35, wedge-shaped grooves 33 into which are press-fitted clamping pieces 36 by means of double screws 37 (see FIG. 10), and chip pockets 34.

The chip pockets 34 are semi-cylindrical grooves and are provided along and in front of the main cutting edges 35a of the inserts 35 with respect-to their rotating direction. The main cutting edge 35a of each insert 35 has a positive axial rake, so that the axis of each chip pocket 34 is also inclined by an angle substantially equal to the axial rake of the main cutting edge 35a. In this embodiment, the chip pockets 34 are inclined so that their depth decreases gradually toward the rear end of the body 31. But their inclination in this direction may be zero.

The chip pockets 34 are closed at the front side of the cutter by barrier walls 38 formed integral with the cutter body 31. During vertical milling operation, the barrier walls 38 are located under the pockets 34. Thus, they serve to prevent chips from dropping. Each barrier wall 38 has a cutout 38a (FIG. 12) at its front end which provides a gap g (preferably about 0.5 mm wide) between the flat drag 35b of the insert 35 and the barrier wall 38. Chips produced by the flat drag 35b are guided into the pocket 34 through the gap g.

Figure 15:
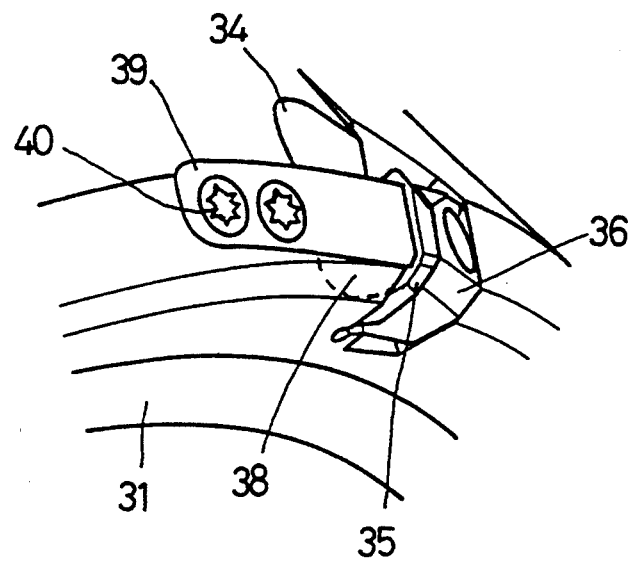
FIG. 15 is a view showing the cover plate as mounted on the cutter.
Figure 14:
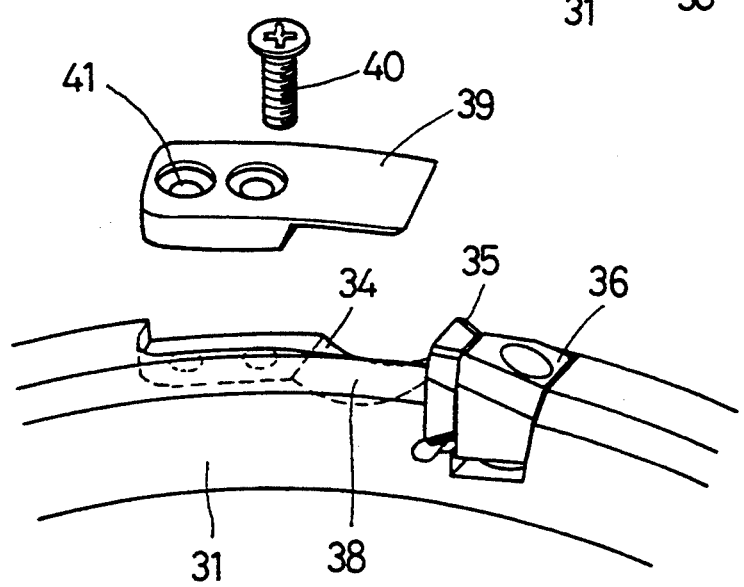
FIG. 14 is a partial front view of another embodiment.
Figure 16:
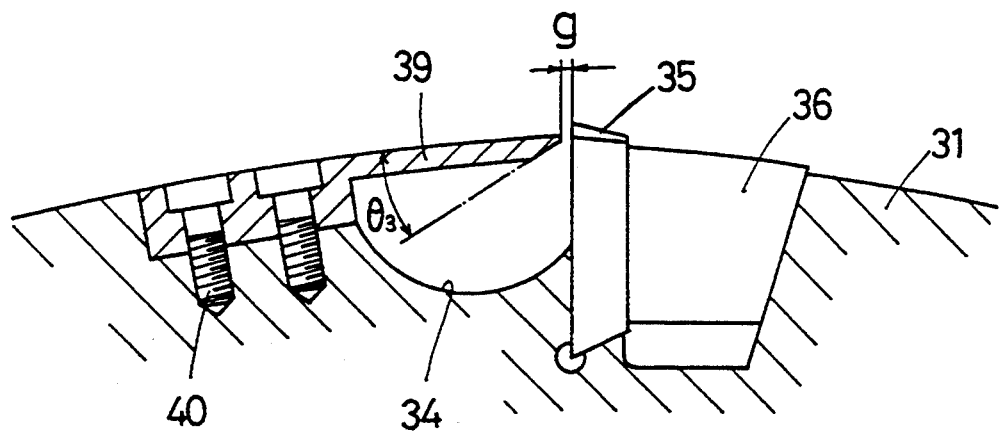
FIG. 16 is a sectional view of the same.

Like conventional cutters of this type, the cutter body 31 is covered with a chip collecting hood of the chip collector. Thus, according to the type of machining, there may be no need to provide any additional barrier means other than the barrier walls 38. But if there is the possibility of chips coming out of the chip pockets 34 through their outer peripheral openings, a cover plate 39 may be put on each pocket to close the outer peripheral opening like a bag as shown in FIGS. 14–16. It is necessary to leave a gap g between the cover plate 39 and the rake face of the main cutting edge 35a to guide chips into the pocket (see FIG. 16).

Figures 12A, 12B:
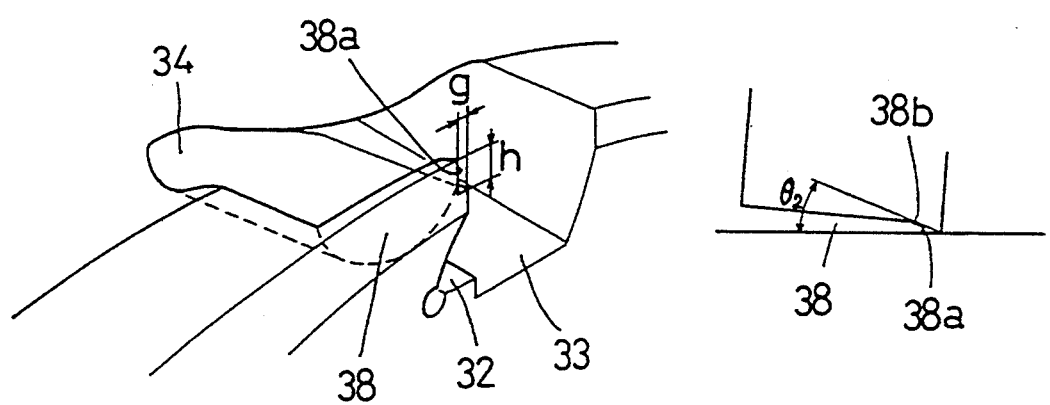
FIG. 12A is a perspective view of one barrier wall and its vicinity.
FIG. 12B is a side view of the same.
Figure 13:
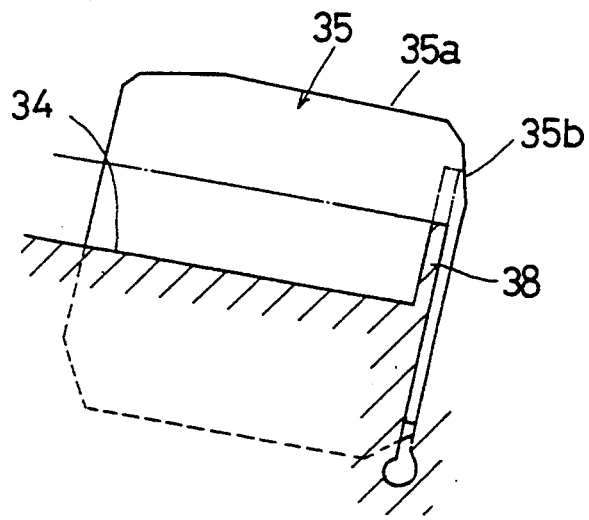
FIG. 13 is a view showing the positional relation between the cutout of each barrier wall and the flat drag.

As shown in FIGS. 12 and 16, the barrier walls 38 and the cover plates 39 have inner tapered surfaces 38b and 39b that extend rearwards from the front edges 38a and 39a at angles of $\theta 2$ and $\theta 3$, respectively. Chips are smoothly guided along the tapered surfaces 38b and 39b into the pockets 34.

Figure 17:
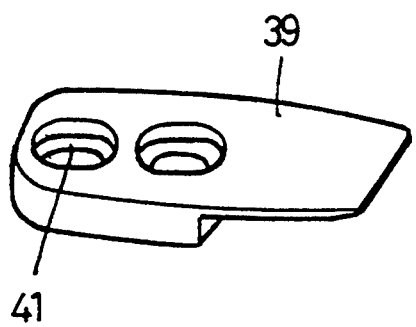
FIG. 17 is a perspective view showing a modified embodiment of the cover plate.

The cover plates 39 are fixed to the body 31 by inserting screws 40 through threaded holes 41 formed in the cover plates 39 (FIG. 16). If the holes 41 are elongated ones as shown in FIG. 17, it is possible to finely adjust the size of gaps between the cover plates 39 and the rake faces of the main cutting edges.

Figure 18:
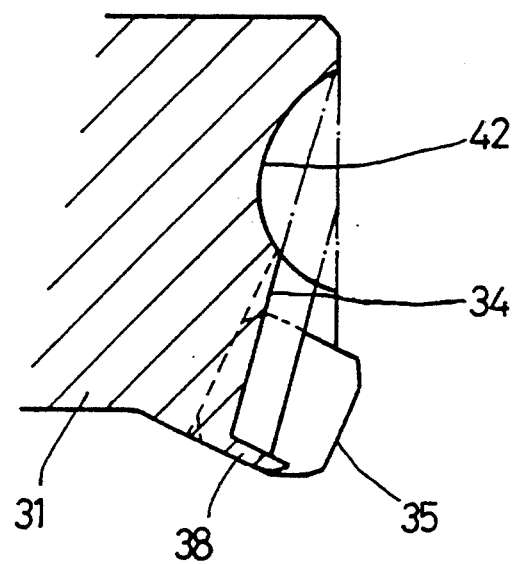
FIG. 18 is a sectional view of the guide groove added.

As shown in FIG. 18, an arcuate guide recess 42 may be formed in the bottom of the groove behind each chip pocket 34. It serves to change the feed direction of chips and guide them diametrically outwardly of the cutter. In this case, a chip collecting space may be provided in the outer peripheral surface of the cutter at a point where the cutter diameter is the largest. This eliminates the step of cutting the rear part of the body to a small diameter.

The barrier walls help improve the chip collecting efficiency by preventing chips from dropping during vertical milling.

According to the present invention, such barrier walls are formed integral with the cutter body. Manufacturing and assembling works are thus less time-consuming and troublesome.

In an arrangement in which most part of the outer peripheral opening of the chip pockets are closed, a cover plate is necessary. But such a cover plate is simpler in shape and can be formed more easily than a conventional guide plate which comprises a barrier wall part and a cover part which are integrally formed so that it has an L-shaped section as a whole.

In an arrangement having the guide recess, it serves to change over the feed direction of chips toward the outer periphery of the cutter. Thus, it is possible to form a chip-collecting space without reducing the diameter of the rear part of the body. This reduces the machining steps.

The face milling cutter according to the present invention has a barrier wall which is integral with the cutter body and which closes the front side of the chip pocket. With this arrangement, it is possible to increase the chip collecting efficiency more easily and at lower cost.

What is claimed is:

1. A chip collector for use with a face milling cutter, said chip collector comprising a cylindrical casing surrounding the face milling cutter, a fixed flange which is provided outside a spindle of a machine tool and which serves as a top lid of said casing, said casing having at upper portion thereof an inner flange having an inner peripheral surface detachably mounted on said fixed flange, and at lower portion thereof a lower ring arranged concentrically with the face milling cutter and located near the cutting edge of the face milling cutter, said entire casing including said inner flange and said lower ring being circumferentially divided into two casing halves substantially at center thereof, said casing being opened and closed by pivoting one of said casing halves about a hinged portion, one of said casing halves being provided with a chip suction hole having a rectangular section and opening for a substantial circumferential length, a spiral sub-chamber expanding gradually outwards from said chip suction hole in the direction of rotation of the face milling cutter, and a discharge duct extending from the end of said sub-chamber in a tangential direction, said lower ring having an inner surface inclined upwards, said lower ring having in said inclined inner surface a plurality of air blowout holes arranged circumferentially at a predetermined pitch and directed substantially in the rotating direction of the face milling cutter to blow out air obliquely upwards.

2. A chip collector as claimed in claim 1 wherein said casing comprises a fixed sleeve carrying said inner flange and a movable sleeve carrying said lower ring and slidably coupled with said fixed sleeve, and wherein said fixed sleeve is provided with a positioning means for keeping said movable sleeve in position at a desired point.

3. A face milling cutter used in combination with the chip collector as claimed in claim 1, said face milling cutter comprising a cutter body having chip pockets and grooves formed in outer periphery thereof, cutting inserts clamped in said grooves, said each cutting insert being formed with a main cutting edge and a flat drag, said chip pockets being formed along said main cutting edges, and barrier walls formed integrally with said cutter body for closing the front side of said chip pockets, a gap being defined between said barrier wall and a rake face of said flat drag so that chips are introduced into said chip pocket through said gap.

4. A face milling cutter as claimed in claim 3, further comprising a cover plate for closing the opening of said chip pocket along the outer periphery of the body, said cover plate being in contact with said barrier wall while leaving a chip-introducing gap between said cover plate and a rake face of said main cutting edge.

5. A face milling cutter as claimed in claim 3 wherein a guide recess is formed in the rear of said each chip pocket for changing the feed direction of chips toward the outer periphery of the cutter.

6. A face milling cutter used in combination with the chip collector as claimed in claim 2, said face milling cutter comprising a cutter body having chip pockets and grooves formed in outer periphery thereof, cutting inserts clamped in said grooves, said each cutting insert being formed with a main cutting edge and a flat drag, said chip pockets being formed along said main cutting edges, and barrier walls formed integrally with said cutter body for closing the front side of said chip pockets, a gap being defined between said barrier wall and a rake face of said flat drag so that chips are introduced into said chip pocket through said gap.

7. A face milling cutter as claimed in claim 4 wherein a guide recess is formed in the rear of said each chip pocket for changing the feed direction of chips toward the outer periphery of the cutter.

8. A face milling cutter as claimed in claim 6, further comprising a cover plate for closing the opening of said chip pocket along the outer periphery of the body, said cover plate being in contact with said barrier wall while leaving a chip-introducing gap between said cover plate and a rake face of said main cutting edge.

9. A face milling cutter as claimed in claim 6 wherein a guide recess is formed in the rear of said each chip pocket for changing the feed direction of chips toward the outer periphery of the cutter.

10. A face milling cutter as claimed in claim 8 wherein a guide recess is formed in the rear of said each chip pocket for changing the feed direction of chips toward the outer periphery of the cutter.

* * * * *